UNITED STATES PATENT OFFICE.

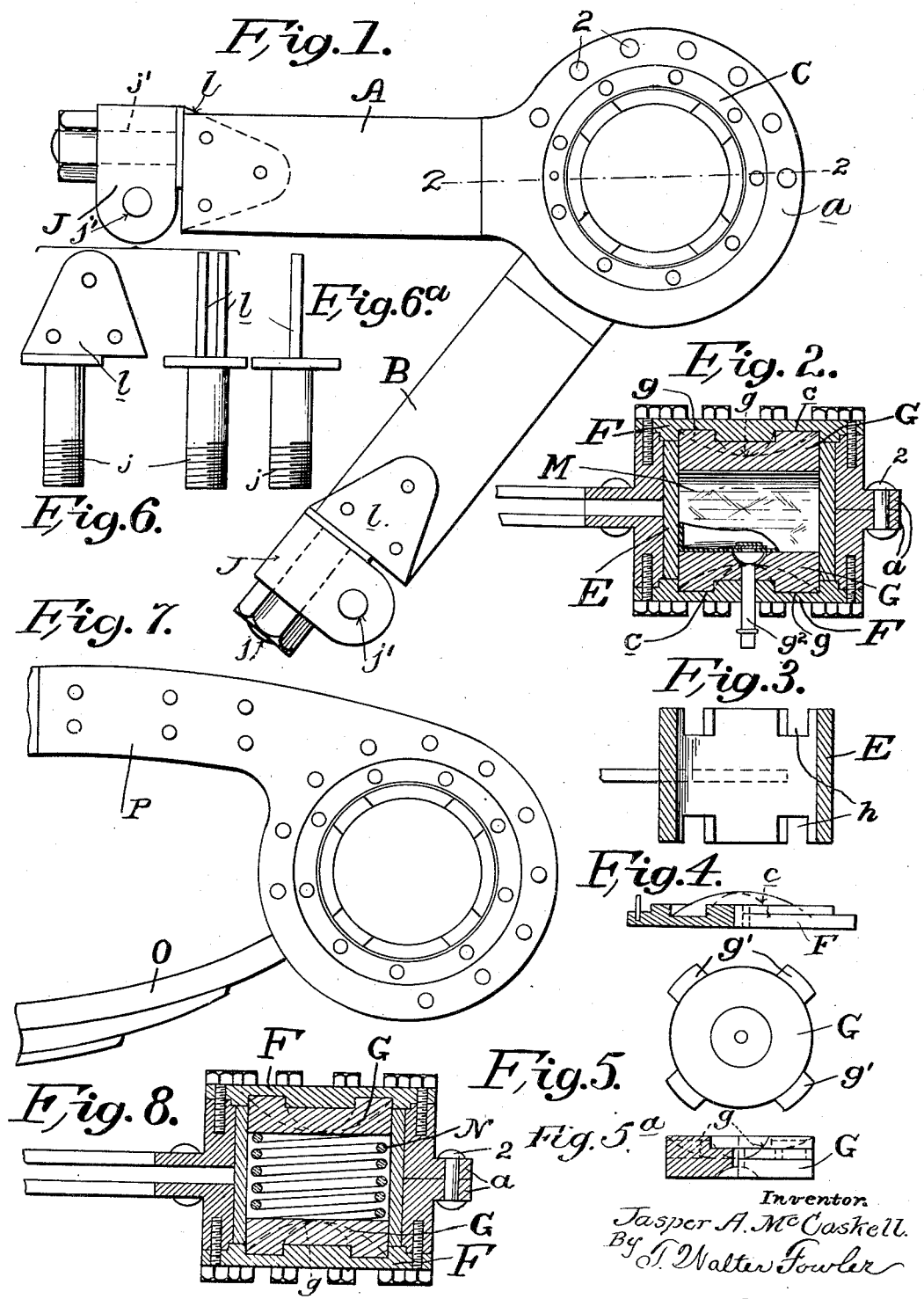

JASPER A. McCASKELL, OF SALT LAKE CITY, UTAH.

SHOCK-ABSORBER.

1,332,506.   Specification of Letters Patent.   Patented Mar. 2, 1920.

Application filed February 13, 1919, Serial No. 276,737. Renewed December 30, 1919. Serial No. 348,382.

*To all whom it may concern:*

Be it known that I, JASPER A. McCAS-KELL, a citizen of the United States, residing at Salt Lake City, in the county of Salt Lake and State of Utah, have invented certain new and useful Improvements in Shock-Absorbers, of which the following is a specification.

My invention relates to devices for opposing resilient resistance to the movement of bodies due to their own inertia. In other words, the invention relates to a means for retarding or modifying the action of vehicle-springs and at the same time it has for its object more particularly to provide a shock absorber for motor-vehicles in which the retarding action exerted by the shock absorber greatly increases as the distance between the axle and the vehicle body becomes greater or less due to the expanding or contracting action of the vehicle spring.

More specifically, the present invention has relation to that type of shock absorber which is described and claimed in my copending application, filed September 14, 1917, Ser. No. 191,433, and which comprises a pair of pivoted arms, one of which arms is adapted to be connected to the vehicle body or to a spring member and the other arm is adapted to be attached to a vehicle spring, and an elastic cushion and compression means at the junction of the arms, as I will hereinafter describe and claim.

In the accompanying drawings forming part of this specification and in which similar reference characters indicate like parts in the different views:

Figure 1 is a side elevation of a shock absorber embodying my invention.

Fig. 2 is a sectional view of the same on the line 2—2 of Fig. 1.

Fig. 3 is a sectional view of the tube or cylinder, E, showing its guide grooves.

Fig. 4 is a sectional view of one of the caps, F, showing its cam-surface.

Fig. 5 is a plan view of one of the pistons, G.

Fig. 5$^a$ is a section of the piston of Fig. 5.

Fig. 6 illustrates elevations of one of the bearings on the ends of the arms.

Fig. 6$^a$ is a bearing of modified form.

Fig. 7 illustrates the shock absorber placed at the junction of the spring-frame and spring of a vehicle.

Fig. 8 is a sectional view showing a modified form of cushion.

In carrying out my invention I construct the absorber with two arms, A and B, which are levers and which may connect with the upper and lower springs of a vehicle in any appropriate and well-known manner. The lever arm, A, is designed to be rigidly connected to a cylindrical casing, C, which, in practice, I prefer to form of similar parts and which parts or members are riveted together by rivets, 2, passing through circumferential flanges $a$, formed on the respective members of the casing, as shown in Fig. 2.

The other lever arm, B, is designed to rigidly connect with an open ended tube or cylinder, E, which is contained within the outer casing, C, and which is capable of partial rotation within the latter, said outer casing, C, having secured to it appropriate end plates or caps, F, which form closures for the ends of the tube or cylinder, and each of said caps having its inner face provided with an appropriate cam surface, $c$, as shown in Fig. 2, which is designed to coact with an appropriate cam surface, $g$, formed on the opposed face of a piston, G, there being one of these pistons at each end of the tube or cylinder, E, and in appropriate abutting and opposing relation with its corresponding cap or closure, F. The space between the inner surfaces of said pistons is designed to be occupied by a resilient member or cushion, which I will hereinafter refer to.

Each of the pistons, G, is provided with radial lugs, $g'$, (Fig. 5), and the ends of the cylinder, E, in which the pistons are contained are provided with recesses, $h$, which register with the radial projections, $g'$ and serve to guide the same as the pistons slide in and out under the sliding action of the cam surfaces on the pistons and caps or cover plates respectively, said projections and registering recesses also serving to hold the pistons against rotation and insuring their true rectilinear motion.

In practice, I prefer that the cam surfaces of the pistons, G, shall be covered with a fiber or other well known material, such as is commonly employed for brake linings and the like so as to prevent the generation of unnecessary heat due to the movement of the cam surfaces on each other.

In Fig. 2, the cushion which is interposed centrally of the cylinder and between the inner surfaces of the opposed pistons is in the form of a flexible cylinder, as a closed ended rubber tube or bag, and this is capable of inflation through the medium of an appropriate valve tube, $g^2$, which is fixed to one of the pistons, G, and extends through the adjacent cap or cover plate, as shown in Fig. 2. When this flexible or rubber cylinder or tube is inflated it becomes an effective cushion for reducing the shock of the vehicle passing over rough places as will be readily understood by those skilled in this art.

While various means may be employed for attaching the present invention to the vehicle, I have shown in Fig. 1, a simple and preferred means for this purpose. This means includes a lug, I, which may be forked as shown in Fig. 6, to straddle the end of the arm, or it may be single as in Fig. 6$^a$, said lug being riveted or otherwise fixedly secured to the arm and provided with a threaded bolt, $j$, adapted to pass through a bearing, J, which is designed to be connected to the vehicle spring or other part by means of a bolt passing through a hole $j'$, in said bearing.

Each of the arms, A, B, is provided with one of the aforesaid lugs; as a matter of fact, the two-pronged or forked lug of Fig. 6, is the one which is secured to the lever arm, B, while the other or single prong lug is the one I usually attach to the arm, A, but it will be manifest that the arrangement may be otherwise and that other agencies may be employed for the proper connection of the absorber to the vehicle, without modifying the action of the salient features of my invention.

If desired, the inflatable cylinder or tube, M, of Fig. 2, may be replaced by a coiled or other spring, N, interposed between the opposed inner surfaces of the pistons, as shown in Fig. 8, and when so employed, the spring will act similar to the inflatable cushion and will be compressed in one of the movements of the arms, A and B, and the corresponding cylinders, C and E, and will exert a pressure on the cam surfaces between the pistons and the cap plates or closures.

In Fig. 7, I illustrate the shock absorber in its position on the end of the spring instead of in the center between the upper and lower springs, and when so employed the arms, A and B, of Fig. 1, may be dispensed with and the corresponding portions of the cylinders C and E may be connected to the spring-frame, P, and the lower spring, O, of the vehicle, it being understood that in this instance the lower spring, by being turned on its end to form substantially the usual eye will become the equivalent of the inner tube or cylinder, E, of the construction shown in Fig. 2. Whether this eye is integral with the spring or made rigid thereto by other means is unimportant.

In view of the foregoing description, it will be understood that as the arms, A and B, are forced from their neutral position, the cam surfaces on the caps, F, and the pistons, G, are engaged, thus forcing the pistons inwardly against the pneumatic tube or cylinder, M, (Fig. 2), or against the coiled spring (Fig. 8), this action occurring when the described shock absorber is placed either on the end of the spring or at some other point between the spring and the vehicle body. In either case as the arms operate there is an increase in resistance produced when the arms are forced from their neutral position due to the pistons, G, being forced against the interposed cushion and this occurs when the arms are moved either toward or away from each other. When using the pneumatic tube or cushion, when the air has been compressed to one half of its original volume, the pressure of the cam surfaces will approximately be doubled.

In my former application, before alluded to, I disclose a larger frictional surface than I have in the present instance but I have found by experience that such a large frictional surface is not required, as the area of the surfaces does not in any way affect the principle of operation. In the present case there is more of a pneumatic resistance and less frictional resistance than in the device of my former application, but in both instances the active principle of the absorber is based on the increased frictional and pneumatic—or other—resistance when the lever arms are moved from their neutral position.

Having thus described my invention what I claim as new and desire to secure by Letters Patent is:—

1. A shock absorber comprising a pair of arms, a casing on the inner end of one of said arms, a tube or cylinder turnable within the casing and fixed to the inner end of the other of said arms, caps fixed to and closing the ends of the casing, pistons within the opposite ends of the tube or casing and spaced from each other, and a resilient member interposed between the inner faces of the pistons, said caps and pistons having their contiguous faces provided with cam-surfaces whereby the pistons are actuated to compress the interposed resilient member to increase the resistance thereof when the lever arms are moved toward or from each other from a normal neutral position.

2. A shock absorber comprising open-ended concentric tubular members having lever-arm extensions; cap-members secured to one of the tubular members, and serving as closures for the open ends of both tubular members, opposed pistons slidably mounted in the outer ends of the inner tubular member, said pistons and the adjacent inner faces of the cap-members having co-acting cam-surfaces, and a resilient cushion interposed between the inner faces of the piston.

3. A shock absorber comprising a pair of arms; a casing on the inner end of one of said arms, said casing being formed of separable sections and having means whereby the sections may be rigidly united; a tube or cylinder turnable within the casing and fixed to the inner end of the other of said arms, caps fixed to and closing the ends of the casing, pistons within the opposite ends of the tube or casing and spaced from each other, and a resilient member interposed between the inner faces of the pistons, said caps and pistons having their contiguous faces provided with cam-surfaces whereby the pistons are actuated to compress the interposed resilient member to increase the resistance thereof when the lever arms are moved toward or from each other from a normal neutral position.

4. A shock absorber comprising open-ended concentric tubular members having lever-arm extensions; cap-members secured to one of the tubular members, and serving as closures for the open ends of both tubular members; opposed pistons slidably mounted in the outer ends of the inner tubular member, said pistons and the adjacent inner faces of the cap-members having co-acting cam-surfaces, and a resilient cushion interposed between the inner faces of the pistons, said pistons and the inner cylinder having registering lug-and-recess connection with each other.

5. A shock absorber comprising open-ended concentric tubular members having lever-arm extensions; cap-members secured to one of the tubular members and serving as closures for the open ends of both tubular members; opposed pistons slidably mounted in the outer ends of the inner tubular member, said pistons and the adjacent inner faces of the cap-members having co-acting cam-surfaces; and a resilient cushion interposed between the inner faces of the pistons, said pistons having radial lugs, and the ends of the inner cylinder having recesses to register with and receive said lugs and to serve as longitudinal guides therefor.

6. A shock absorber comprising open-ended concentric tubular members having lever-arm extensions; cap-members secured to one of the tubular members and serving as closures for the open ends of both tubular members; opposed pistons slidably mounted in the outer ends of the inner tubular member, said pistons and the adjacent inner faces of the cap-members having co-acting cam-surfaces; a resilient cushion interposed between the inner faces of the pistons; lugs on the lever arm extensions having threaded bolt portions, and bearings on said bolt portions having means for the attachment of said extensions.

In testimony whereof I affix my signature.

JASPER A. McCASKELL.